Aug. 10, 1954 A. N. GOLDSMITH 2,686,218
COLOR TELEVISION SYSTEM
Filed Oct. 25, 1949

INVENTOR
Alfred N. Goldsmith
BY
ATTORNEY

Patented Aug. 10, 1954 2,686,218

UNITED STATES PATENT OFFICE 2,686,218

COLOR TELEVISION SYSTEM

Alfred N. Goldsmith, New York, N. Y., assignor to Radio Corporation of America, a corporation of Delaware Application October 25, 1949, Serial No. 123,340

4 Claims. (Cl. 178—5.4)

Figure 1:
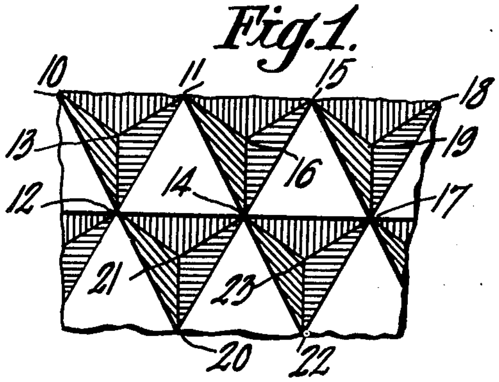

This invention relates to color television systems and more particularly to a color television system wherein pickup or reproduction of the image is effected by means including a special form of cathode ray tube having a fluorescent target area in the form of tetrahedral or prismatic indentations, which (1) are systematically arranged, (2) are coated on their various faces with appropriately responsive material and (3) are scanned by electron guns each arranged to scan a different surface of the various indentations.

It is widely recognized that the most desirable types of color television systems are those which (1) are of the simultaneous type and (2) employ only electronic means for the pickup and reproduction of the images. While the present invention can be applied either to simultaneous or sequential color television, it is peculiarly adapted to simultaneous color television of the electronic type.

In the past, there have been devised ingenious and practical methods for producing simultaneous electronic color television pictures through the use of three image tubes or kinescopes each of which produces a color-separation image in a corresponding component color. The three images thus produced are superimposed in accurate registry by means of a suitable projection system including a projection lens or a plurality of such lenses. It is preferable, however, to have the color image produced on a single fluorescent screen. In the present invention, the color image is produced on a single screen by a number of electron guns equal to the number of component colors and key-image colors which are utilized.

In this respect, the present invention is similar to that disclosed by my copending application, Serial No. 543,233, filed August 5, 1944, now United States Patent No. 2,481,839, granted September 13, 1949. This copending application discloses a color television system which (1) is of the electronic type, (2) utilizes a single screen upon which the color image is formed and (3) utilizes a plurality of electron guns mounted at different angles with respect to the screen for forming the color image. The screen disclosed by the aforesaid application, however, differs from that of the present invention in that it has a plurality of tetrahedral or prismatic projections whereas that herein disclosed has a plurality of tetrahedral or prismatic indentations. In each case, the projections or indentations are of sub-elemental size or area and are located in a quasifocal plane of the impinging electron beams by which they are scanned.

Making these sub-elemental areas in the form of indentations instead of projections results in several important advantages. Thus the non-fluorescent areas lying between the indentations are nearer to the electron guns than the sub-elemental and fluorescent areas thus acting somewhat as material shields so that the effect of each electron gun is confined to a corresponding area of the various indentations. Further advantages are that the screen is readily formed by pressing a positive matrix into a plastic or softened transparent material and that an indentation so produced is easily made more accurate in form and more minute in size. Further, the non-fluorescent areas lie in a plane, and can if necessary be either readily cleaned or, alternatively, coated with any desired material.

The aforesaid copending application discloses, in considerable detail, keystone-correcting circuits adapted to change images, which are singly-obliquely-scanned, or doubly-obliquely-scanned, into truly rectangular images in accurate registry with one another. Such circuits are used in connection with the present invention but are not described herein for the reason that the present invention is directed more especially to the form of the cathode ray tube by which differently colored images are formed.

The invention will be better understood from the following description considered in connection with the accompanying single sheet of drawings, and its scope is indicated by the appended claims.

Figure 2:
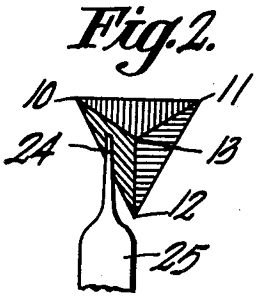
Figure 3:
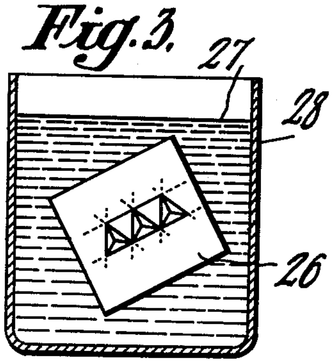
Figure 4:
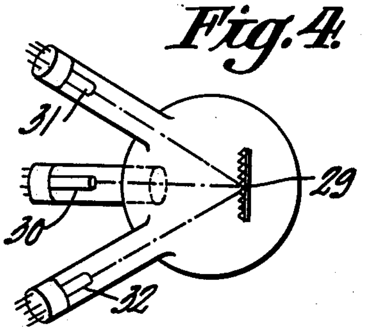
Figure 5:
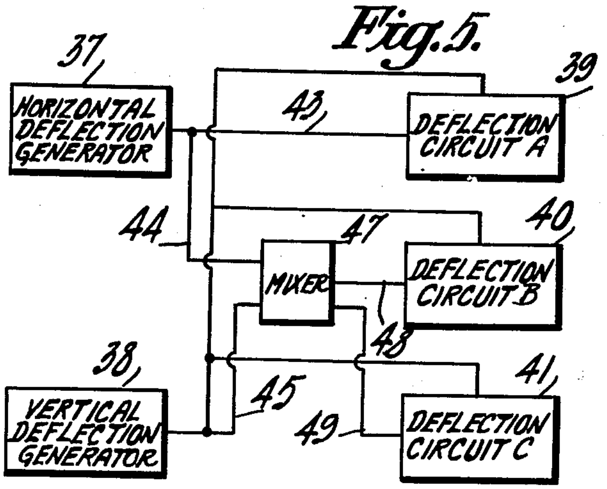
Figure 6:
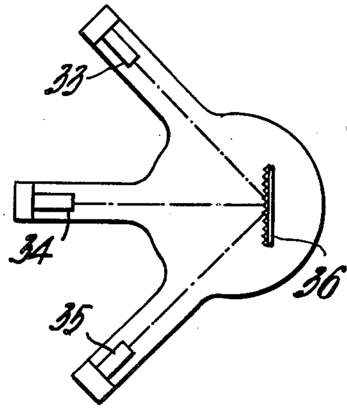

Referring to the drawings:

Figure 1 illustrates an enlargement of a minor portion of the target area of the cathode ray tube which forms a part of the present invention, Figure 2 illustrates the use of a miscroscopic spray gun for coating corresponding surfaces of tetrahedral indentations of the target, Figure 3 illustrates a method in which the corresponding surfaces of the indentations are coated by sedimentation, Figure 4 illustrates a triple-gun kinescope suitable for tricolor operation, Figure 5 illustrates electron beam deflection circuits which are suitable for controlling the scanning of the target of the tube illustrated by Figure 4, and Figure 6 illustrates a kinescope having a target provided with squared-pyramidal indentations.

Figure 7:
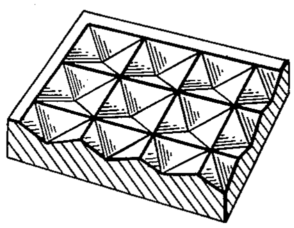

Figure 7 illustrates by an isometric drawing the target detail of one form of this invention.

Figure 1 is a plan view of an exemplary group of five tetrahedral indentations in a target screen which is the color-image screen of a cathode ray tube or kinescope. These five indentations have their boundaries indicated by reference numerals 10—11—12—13, 11—15—14—16, 15—18—17—19, 12—14—20—21 and 14—17—22—23 respectively. Thus the respective peaks of the tetrahedral indentations are indicated by the reference numerals 13, 16, 19, 21 and 23 and their respective bases are indicated by the reference numerals 10—11—12, 11—15—14, 15—18—17, 12—14—20 and 14—17—22. These bases are in a common plane and have interposed between them flat triangular surfaces which have their respective boundaries indicated by the reference numerals 11—14—12, 14—15—17 and 14—22—20.

All the indentations are alike and the same is true of the triangular flat surfaces between the bases of the indentations.

The indentation 10—11—12—13, for example, (1) has its surface 10—13—12 coated with a fluorescent material or phosphor corresponding to one of the component colors such as red, (2) has its surface 10—11—13 coated with a green phosphor and (3) has its surface 11—12—13 coated with a blue phosphor. The corresponding surfaces of all the other indentations of the target are similarly coated.

The flat triangular surfaces, such as 11—14—12, are inactive in the production of the color image and may be covered with black enamel, a diffusing whitish material or the equivalent. Any phosphors falling on these flat surfaces during the coating of the indentations should and can be removed by a precision process prior to putting the target into use, since these areas are not selectively responsive to the electron beams forming the different component-color images.

The indentations are much smaller than shown in Figure 1. They may be produced by pressing a suitably formed matrix into a plastic or softened-glass sheet or the like. Such matrix is made of a non-corrodible heat-resistant metal or other substance having a sufficiently high melting point. It may be either heated or cooled depending on the nature, temperature, and degree of flow of the material to be indented.

In the event that the matrix is to carry tetrahedral, these may be produced thereon by using a V-cutter which is pointed by a diamond, or the equivalent, accurately polished into the desired shape. This cutter is first run across the surface near one of its edges. The cut is then repeated at distances such that the ridges between the cuts are of appropriate height for the tetrahedral surfaces of the indentations. This process is repeated until the entire surface carries a series of V-grooves appropriately separated by a spacing of sub-elemental extent. Upon the completion of this first series of grooves, the surface of the matrix is then turned in its own plane through an angle of 120 degrees and a second series of similar grooves are cut. This is followed by the cutting of a third series of similar grooves at angles of 120 degrees with the first and second series of grooves. The result is a matrix having a multiplicity of sub-elemental tetrahedral projections. Such a matrix, when pressed into a suitable surface, will produce the desired indentations.

If the matrix is to have square pyramidal projections, the process is similar to that described above with the exception that the different series of V-cuts are made at angles of 90 degrees.

Alternatively, the matrix may be produced from a much larger replica by the micro-pantograph methods which are used in the production of dies for coins, medals, and the like.

In producing the target, (1) the matrix may be pressed into heat-softened plastic or glass, (2) the glass or plastic may be flowed over the matrix or (3) a plastic may be molded against the matrix by injection pressure molding it at an appropriate temperature. Alternatively, the matrix bent into a true circle may be rolled, with suitably regulated pressure, over heat-softened glass or plastic. The first of the above-mentioned procedures is considered preferable.

The tetrahedral type of matrix gives a greater responsive surface on the final screen or target (for tricolor operation) and better exclusion of undesired electron-beam impact. The square prismatic type has the advantage that it permits a simpler form of keystone correction and image registration and permits a possible added black-and-white key image formed by a monochromatic phosphor on the fourth surface of the indentations.

In covering the flat surfaces between the bases of the indentations with an opaque and non-responsive material, a black enamel or glass may be rolled over the surface, care being taken that it does not get into the indentations, after which the enamel is fired and thus fixed in position. Alternatively the coating may be settled on the surface by sedimentation and thereafter fired or otherwise fixed on the surface if it is not sufficiently rugged as formed by sedimentation.

Figure 2 illustrates a method of coating one set of surfaces of the tetrahedral indentations by means of a microscopic spray gun. It is assumed that the surface 10—11—13 is to be coated with a red-responsive phosphor. A spray gun 25 (only partly shown) has its nozzle 24 oriented so that the ejected spray is impacted primarily upon the surface 10—11—13.

The spray gun 25 is mounted on a suitable reciprocating carriage (not shown) which is automatically driven. The direction of travel of the carriage is accurately oriented with respect to the line 10—11. If spray is ejected continuously, the nozzle 24 is withdrawn at the end of each line of spraying by a distance equal to the spacing between the line 10—11 and the point 12, and this process is repeated for each additional series of indentations. It is also possible to control the spray by a suitable high-speed valve so that the spray (1) is at a maximum velocity and quantity of efflux when the nozzle faces the center of the surface 10—11—13 and (2) is cut off when not directed at this surface. Further, it is possible to use a multiplicity of such spray guns to coat a number of adjacent or separated lines of tetrahedral surfaces simultaneously.

Figure 3 illustrates a method of coating the corresponding surfaces of the indentations by sedimentation. In this case, the screen 26 is placed within the liquid 27 so that the surfaces to be coated are horizontal. The liquid 27 is contained in a tank 28 and contains a finely-suspended phosphor which is deposited on the horizontally disposed surfaces.

After this process has been concluded, the screen 26 is placed in another tank containing the finely divided second phosphor. In this case, the screen 26 is reoriented so that the next series of the surfaces of the indentations is horizontally disposed and coated by sedimentation of the finely divided phosphor. This process is then repeated with the third phosphor in another tank. Thereafter any phosphor deposited on the flat triangular areas between the indentations is removed.

Figure 4 illustrates a triple-gun kinescope for tricolor operation which includes the target screen 29 and three electron guns 30, 31 and 32. Gun 30 produces an electron beam which impinges on the screen 29 at an agle such that it may be moved to scan one series of the surfaces of the indentations. Guns 31 and 32 produce electron beams similarly disposed with respect to the other two series of the surfaces of the indentations. Thus the beam 30 may be made to scan the area 10—11—13 (see Figure 1) and similar areas, the beam 31 may be made to scan the area 11—12—13 and similar areas, and the beam 32 may be made to scan the area 10—12—13 and similar areas. This means that the guns 30, 31 and 32 (1) are displaced from one another by angles of 120 degrees in the case of the tetrahedral indentations of the target of Figure 4 and (2) are otherwise so disposed that the beam from gun 30 impinges on the screen 29 at an angle and in a plane parallel to the vertical sides of the screen, while the beams from the guns 31 and 32 are at a similar angle and are doubly oblique in their scanning.

Figure 6 illustrates the case of a kinescope having a target 36 with squared-pyramidal indentations. In this case, the guns 33 and 34 are separated by an angle of 45 degrees and there is a similar angle between the guns 34 and 35. The beam from the gun 34 impacts normally on the screen 36. The beams of the guns 33 and 35 are symmetrically inclined relative to the beam from the gun 34 and in the same vertical plane. Thus the keystone-correcting circuits for the beams from the guns 33 and 35 will be the same relative to the horizontal deflection but of opposite polarity. The vertical deflections for all three beams may be derived from the same vertical deflection generator.

Figure 7 shows an enlargement of a section of the screen employing squared pyramidal indentations.

Figure 5 illustrates a circuit suitable for utilizing the deflection currents or voltages so that there is a minimum of variation between the sizes and positions of the component-color images. This circuit includes a horizontal deflection generator 37 and a vertical deflection generator 38. Potential is applied to the vertical deflectors of the three deflection circuits 39, 40 and 41 from the generator 38 through a lead 42. The horizontal deflectors of the circuit 39 are connected directly to the generator 31 through a lead 43. If it is desired to introduce a component from the vertical deflection generator 38 into the horizontal deflection potential of the circuits 40 and 41, this is accomplished by connecting the generators 37 and 38 through leads 44 and 45 to the input of a mixer 47 which has its output connected to the circuits 40 and 41 through the leads 48 and 39. It is to be understood that these connections are such that the potentials applied through the leads 48 and 49 are of opposite polarity. This type of deflection circuit has the important advantage that the symmetrical geometrical arrangement of the electron guns is utilized so that the mixed deflection currents may be fed to pairs of deflectors acting on different symmetrical beams. Thus any current or voltage variations, or component changes in the circuits, have minimal effect on image registration.

What the invention provides is an improved color television system which includes (1) a multicolor image transmitting or reproducing cathode ray tube having a target screen provided with indentations so arranged and coated that each group of the corresponding surfaces of the indentations may be scanned by a different electron beam for producing a different component color of the image, (2) improved methods of applying different coatings to the different groups of corresponding surfaces, and (3) an improved deflection circuit for controlling the movement of the different electron beams by which the different groups of corresponding surfaces are scanned.

What is claimed is:

1. A color television system including an electron tube having a target screen bearing similar multi-surface indentations so arranged that each group of their corresponding surfaces are in successive rows and the rows of each group are at an angle with the rows of the other groups, a plurality of means for forming different electron beams each adapted to scan a different group of said groups of corresponding surfaces, a beam deflection circuit including (1) means for developing a horizontal deflection potential for moving the first of said beams along a row of the first of said groups, (2) means for developing opposed deflection potentials which are the resultants of vertical and horizontal deflection potential components for moving the second and third of said beams respectively along a row of the second and third of said groups and (3) means for developing a vertical deflection potential by which said first, second and third beams are moved into alignment with the successive rows of said first, second and third groups, and means rendering said groups each emissive of light in a different component color in response to the application of an electron beam.

2. The combination of an electron tube including a target screen bearing similar multi-surface indentations so arranged that each group of their corresponding surfaces are in successive rows and the rows of each group are at an angle with the rows of the other groups, means for forming different electron beams each adapted to scan a different one of said groups of corresponding surfaces, vertical and horizontal deflectors for each of said beams, means for applying a vertical deflection potential to the vertical deflectors of all of said beams, means for applying a horizontal deflection potential to the horizontal deflectors of the first of said beams, and means for combining said vertical and horizontal potentials to produce a resultant potential which is applied with opposed polarity to the horizontal deflectors of the second and third of said beams.

3. The combination of an electron tube including a target screen bearing similar multi-surface elements so arranged that each group of their corresponding surfaces are in successive rows and the rows of each group are at an angle with the rows of the other groups, means for forming different electron beams each adapted to scan a different one of said groups of corresponding surfaces, vertical and horizontal deflectors for each of said beams, means for applying a vertical deflection potential to the vertical deflectors of all of said beams, means for applying a horizontal deflection potential to the horizontal deflectors of the first of said beams, and means for combining said vertical and horizontal potentials to produce a resultant potential which is applied with opposed polarity to the horizontal deflectors of the second and third of said beams.

4. The combination of an electron tube including a target screen bearing similar multi-surface indentations so arranged that each group of their corresponding surfaces are in successive rows and the rows of each group are at an angle with the rows of the other groups, means for forming different electron beams each adapted to scan a different one of said groups of corresponding surfaces, vertical and horizontal deflectors for each of said beams, means for applying a vertical deflection potential to the vertical deflectors of all of said beams, means for applying a horizontal deflection potential to the horizontal deflectors of the first of said beams, means for combining said vertical and horizontal potentials to produce a resutlant potential which is applied with opposed polarity to the horizontal deflectors of the second and third of said beams, and means rendering said groups each emissive of light in a different component color in response to the application of an electron beam.

References Cited in the file of this patent

UNITED STATES PATENTS

| Number | Name | Date |
|---|---|---|
| 2,480,848 | Geer | Sept. 6, 1949 |
| 2,481,839 | Goldsmith | Sept. 13, 1949 |